United States Patent
Zhao et al.

(10) Patent No.: US 11,753,317 B2
(45) Date of Patent: Sep. 12, 2023

(54) METHOD FOR ACCURATE POSITIONING AND IN-SITU TREATMENT OF POLLUTANTS AT SEDIMENT-WATER INTERFACE

(71) Applicant: CHINESE RESEARCH ACADEMY OF ENVIRONMENTAL SCIENCES, Beijing (CN)

(72) Inventors: Chen Zhao, Bijing (CN); Xiaoguang Li, Beijing (CN); Guowen Li, Beijing (CN); Lieyu Zhang, Beijing (CN); Caole Li, Beijing (CN); Wei Li, Beijing (CN); Jiaqian Li, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 17/243,771

(22) Filed: Apr. 29, 2021

(65) Prior Publication Data
US 2022/0073382 A1  Mar. 10, 2022

(30) Foreign Application Priority Data
Sep. 7, 2020 (CN) .......................... 202010926478.2

(51) Int. Cl.
*C02F 1/469* (2023.01)
*C02F 1/66* (2023.01)
*C02F 1/00* (2023.01)

(52) U.S. Cl.
CPC .............. *C02F 1/4693* (2013.01); *C02F 1/66* (2013.01); *C02F 2001/007* (2013.01);
(Continued)

(58) Field of Classification Search
CPC ..................................................... C02F 1/4693
See application file for complete search history.

(56) References Cited

U.S. PATENT DOCUMENTS

2005/0115892 A1* 6/2005 Fleury ....................... C02F 3/34
210/602

FOREIGN PATENT DOCUMENTS

| CN | 109399858 A | * | 3/2019 |
| CN | 109399858 A | | 3/2019 |

(Continued)

OTHER PUBLICATIONS

Chinese Application No. 202010926478.2, First Office Action dated May 19, 2021, 10 pages.

*Primary Examiner* — Peter Keyworth
(74) *Attorney, Agent, or Firm* — Jaffery Watson Mendonsa & Hamilton LLP

(57) ABSTRACT

The present application relates to the technical field of water environment governance, and particularly discloses a method for accurate positioning and in-situ treatment of pollutants at a sediment-water interface. In the method, high-throughput sequencing technology and pollutant source apportionment technology are firstly used to perform accurate positioning on the sediment to be controlled, and then electrodialysis-vacuum negative pressure dewatering technology is used to perform in-situ dewatering treatment on the sediment to be controlled, thereby realizing accurate governance with the minimum desilting amount. In the present application, in further cooperation with the application of microbial reagents, the microbial flora environment of the sediment-water interface is regulated, thereby increasing the dewatering speed of the sediment.

9 Claims, 1 Drawing Sheet

(52) U.S. Cl.
CPC ...... *C02F 2209/06* (2013.01); *C02F 2209/36* (2013.01); *C02F 2301/063* (2013.01); *C02F 2305/06* (2013.01)

(56) References Cited

FOREIGN PATENT DOCUMENTS

| | | | | |
|---|---|---|---|---|
| CN | 109879436 | A | * | 6/2019 |
| CN | 109879436 | A | | 6/2019 |
| CN | 110156267 | A | * | 8/2019 |
| CN | 110422956 | A | * | 11/2019 |
| CN | 111139203 | A | | 5/2020 |
| KR | 101941008 | B1 | | 1/2019 |
| KR | 20190031845 | A | | 3/2019 |

* cited by examiner

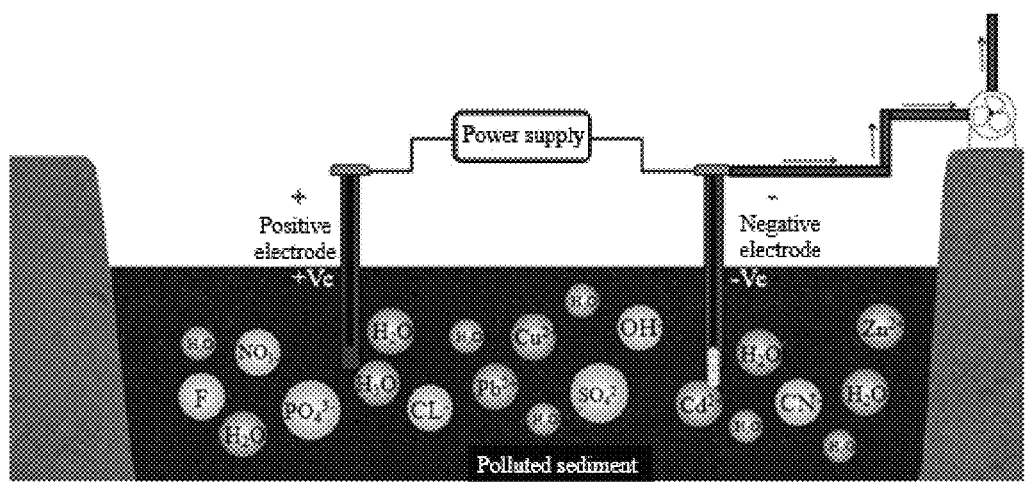

METHOD FOR ACCURATE POSITIONING AND IN-SITU TREATMENT OF POLLUTANTS AT SEDIMENT-WATER INTERFACE

CROSS REFERENCE TO RELATED APPLICATION

This application claims the benefit of Chinese Patent Application No. 2020109264782, filed Sep. 7, 2020, which is hereby incorporated by reference herein in its entirety.

TECHNICAL FIELD

The present application relates to the technical field of water environment governance, in particular to positioning and treatment of sediment.

BACKGROUND

The pollutant control technology for the river/lake sediment-water interface is currently the frontier and priority development field of lake science. Domestic and foreign scholars have carried out multidisciplinary research on the river/lake sediment-water interface, and have achieved lots of results, mainly focusing on the structure and features of the sediment-water interface, the mode of occurrence of nutrient elements, adsorption/desorption and its kinetics, environmental factor influence, and the like.

However, although the pollutant control technology for the river/lake sediment-water interface has attracted great attention in the field of lake science, its level of development is far from enough to cope with the huge pressure of river/lake water environment governance in China at the present stage, the domestic mature technology for sediment dewatering is still lacking, and the cost remains high.

At present, electrodynamic sludge dewatering technology is often used to dredge and dewater the sediment with a sludge pump and a plate-frame pressure filtration. However, although this method can use electrolysis technology to remove heavy metals in the sludge, it is difficult to accurately locate the pollutants in the sludge, the dewatering rate can only reach 25%, ion-exchange membrane treatment is still required subsequently, and the overall operating cost is relatively high.

SUMMARY

In order to solve the problems in the prior art, an objective of the present application is to provide a method for accurate positioning and in-situ treatment of pollutants at a sediment-water interface to realize accurate positioning and in-situ treatment on sediment to be controlled and reduce the treatment cost while improving the treatment efficiency.

To achieve the objective of the present application, the technical solution of the present application is as follows:

The present application provides a method for accurate positioning and in-situ treatment of pollutants at a sediment-water interface, wherein high-throughput sequencing technology and pollutant source apportionment technology are firstly used to perform accurate positioning on sediment to be controlled. Then electrodialysis-vacuum negative pressure dewatering technology is used to perform in-situ dewatering treatment on the sediment to be controlled.

Further, in the method of the present application, a high-throughput sequencing means in molecular biology is used to analyze the abundance of an alkaline phosphatase phoD functional flora in the sediment, and the position of the sediment to be controlled is determined according to the analysis result.

Furthermore, in the method of the present application, the pollutant source apportionment technology is used to measure emission flux of bioavailable phosphorus of the sediment at different depths at the determined position of the sediment to be controlled, and a depth of the sediment to be controlled is determined according to the measurement result.

Further, the specific method for performing in-situ dewatering treatment on the sediment in the method of the present application includes: using nitrate to adjust the pH of a water body of an area to be controlled to 7.5-8.3, and changing a dominant flora in the sediment; and placing the sediment to be controlled in a low-voltage high-current electric field, and performing dewatering treatment on the sediment under vacuum negative pressure conditions.

Preferably, after the nitrate is added, low-oxygen aeration treatment is performed on the water body.

An oxygen aeration amount of the low-oxygen aeration is 30-60 mg/L, preferably 50 mg/L.

Preferably, the low-voltage high-current electric field is an electric field with a voltage of 10-12 V and a current of 8-10 A.

More specifically, the method of the present application includes the following steps:

(1) taking sediment samples at different positions of the sediment-water interface in a river/lake water area to be controlled, extracting microbial DNA in the samples, performing 16sRNA high-throughput sequencing analysis to obtain an abundance of the alkaline phosphatase phoD functional flora in the sediment samples at the different positions, and determining the sampling position of the sediment sample with the abundance of the alkaline phosphatase phoD functional flora of greater than 25% as the position of the sediment to be controlled;

(2) measuring emission flux of bioavailable phosphorus of the sediment at different depths at the determined position of the sediment to be controlled in step (1), and determining a depth range where the emission flux is greater than 0.6 mg/L as the depth of the sediment to be controlled; and (3) performing dewatering treatment on the sediment to be controlled on the basis of the determined position and depth of the sediment to be controlled in step (1) and step (2): firstly using nitrate to adjust the pH of a water body of an area to be controlled to 7.5-8.3, and changing a dominant flora in the sediment in cooperation with low-oxygen aeration; and then placing the sediment to be controlled in a low-voltage high-current electric field, and performing dewatering treatment on the sediment under vacuum negative pressure conditions.

By adding the nitrate to the sediment and adopting the low-oxygen aeration manner, the water body can present a facultative aerobic state. With the participation of denitrifying bacteria, organic matters in the water body can be quickly consumed in a short time. At the same time, due to the reproduction of the denitrifying bacteria, the denitrifying bacteria can form a competition mechanism with sulfur bacteria to inhibit the growth of the sulfur bacteria, thereby inhibiting the production of hydrogen sulfide.

The nitrate is sodium nitrate and/or potassium nitrate.

The denitrifying bacteria include *Pseudomonas denitrificans, Thiobacillus denitrificans, Micrococcus denitrificans*, and the like.

Furthermore, the low-voltage high-current electric field is formed by the following method: positive and negative electrodes are placed oppositely at an edge of the sediment to be controlled and inserted into the sediment, and a voltage of 12 V and a current of 10 A are applied to form the low-voltage high-current electric field.

For the electrode, a carbon fiber bundle used as a conductive current collector and conductive carbon black and graphite powder used as conductive materials are blended with plastic and thermoformed to obtain an electrode material.

Preferably, the depth at which the positive and negative electrodes are inserted into the sediment is ⅔ of the length of the electrode.

Furthermore, the sediment and its surrounding water body (sediment-water mixture) are sucked in by a vacuum negative pressure device through a water pipe and then are dewatered. Due to the addition of the nitrate and the low-oxygen aeration treatment, the sediment to be controlled has been transformed from a sulfur-based autotrophic denitrification process to an autotrophic-heterotrophic denitrification coupled process. At the same time, under the action of the low-voltage high-current electric field, heavy metals and positively charged water molecules move to the cathode under the action of the electric field, thereby realizing sludge dewatering and coordinated removal of heavy metals. The sediment treatment method of step (3) can increase the dewatering speed of the sediment to be controlled, reduce the water content of viscous sediment with poor permeability to about 50%, and reduce the volume of the sediment by 20-30%.

In the present application, the term "alkaline phosphatase phoD functional flora" refers to a functional flora with the function of hydrolyzing organic phosphorus, mainly including bacteria of the genera *Limnohabitans, Pirellula, Plesiocystis*, and the like. The alkaline phosphatase phoD functional flora can remove phosphate groups on molecules such as nucleotides, proteins, alkaloids, and the like to perform dephosphorylation, and is most effective in alkaline environments.

The high-throughput sequencing technology and the pollutant source apportionment technology adopted in the present application may include existing technical means in the art, which are only exemplified in specific implementations of the present application and will not be otherwise limited.

The raw materials or reagents involved in the present application are all common commercially available products, and the operations involved may include conventional operations in the art unless otherwise specified.

Based on conforming to common knowledge in the art, the above-preferred conditions can be combined with each other to obtain specific implementations.

The present application has the following beneficial effects:

In the present application, the high-throughput sequencing technology and the pollutant source apportionment technology are used to perform accurate positioning on the dredged area of the sediment to be controlled, and the electrodialysis-vacuum negative pressure dewatering technology is used to perform in-situ dewatering treatment on the sediment to be controlled, thereby realizing accurate governance on the river/lake water environment with the minimum desilting amount.

In the present application, in further cooperation with the application of microbial reagents, the microbial flora environment of the sediment-water interface is regulated, thereby realizing the transformation of the sediment from a sulfur-based autotrophic denitrification process to the autotrophic-heterotrophic denitrification coupled process and increasing the dewatering speed of the sediment. In combination with the electrodialysis-vacuum negative pressure dewatering technology of the present application, the water content of the sediment can be reduced to about 50%, the volume of the sediment can be reduced by 20-30%, and the dewatering cost of electrodynamic sludge dewatering and the subsequent treatment cost can be reduced by 30% or above and about 40%, respectively. While increasing the dewatering rate, the operating cost and subsequent treatment cost are reduced, and good social benefits and economic benefits are obtained.

BRIEF DESCRIPTION OF THE DRAWINGS

FIG. 1 is a schematic diagram of the electrodialysis-vacuum negative pressure dewatering technology of the present application.

DETAILED DESCRIPTION

The present application provides a method for accurate positioning and in-situ treatment of pollutants at a sediment-water interface, specifically including the following steps:

(1) Sediment samples are taken at different positions of the sediment-water interface in a river/lake water area to be controlled, microbial DNA in the samples is extracted, 16sRNA high-throughput sequencing analysis is performed to obtain abundance of alkaline phosphatase phoD functional flora in the sediment samples at the different positions, and the sampling position of the sediment sample with the abundance of the alkaline phosphatase phoD functional flora of greater than 25% is determined as the position of the sediment to be controlled.

(2) Emission flux of bioavailable phosphorus of the sediment at different depths is measured at the determined position of the sediment to be controlled in step (1), and a depth range where the emission flux is greater than 0.6 mg/L is determined as the depth of the sediment to be controlled.

The emission flux of bioavailable phosphorus is calculated by using a pore water diffusion model method. Based on the concentration gradient of sediment interstitial water and overlying water, the emission flux of bioavailable phosphorus of the sediment is calculated according to Fick's first law.

Calculation formula:
$$F = \varphi \cdot D_S (\partial c / \partial Z)_{Z=0}$$

where: F is the diffusion flux of molecules at the sediment-water interface, $mg \cdot (m^2 \cdot d)^{-1}$;

$\varphi$ is the porosity of the sediment, %;

$D_S$ is the actual diffusion coefficient of the molecules, $cm^2 \cdot s^{-1}$;

$(\partial c / \partial Z)_{Z=0}$ is the concentration gradient of the molecules at the sediment-water interface, $mg \cdot (L \cdot cm)^{-1}$; and the empirical relationship between $D_S$ and $\varphi$ is $D_S = \varphi^2 D_O$ ($\varphi \leq 0.7$), $D_S = \varphi D_O$ ($\varphi > 0.7$).

(3) Dewatering treatment is performed on the sediment to be controlled on the basis of the determined position and depth of the sediment to be controlled in step (1) and step (2): firstly using nitrate to adjust the pH of a water body of an area to be controlled to 7.5-8.3, and changing a dominant flora in the sediment in cooperation with 50 mg/L low-oxygen aeration; and then placing the sediment to be controlled in a low-voltage high-current electric field with a voltage of 12 V and a current of 10 A, and performing dewatering treatment on the sediment under vacuum negative pressure conditions.

After the nitrate is added, the dominant flora in the sediment transforms from Clostridia to Gamma-proteobacteria at the class level, its relative abundance can reach 60.0%, and anaerobic florae such as sulfur bacteria and like are effectively suppressed. Denitrifying florae such as *Rhodanobacter, Thiobacillus, Thermomonas*, and the like appear at the genus level, which creates a good and stable habitat for the ecosystem at the bottom of the water body and realizes the objective of regulating intercellular water in the sediment.

A carbon fiber bundle with excellent conductivity used as a conductive current collector and conductive carbon black and graphite powder used as key conductive materials are blended with plastic and thermoformed to prepare a novel electrode material whose conductivity and mechanical properties all satisfy electrodynamic dewatering, thereby solving the problems of high price and poor mechanical properties in the traditional electrode materials (such as precious metal coated electrodes, graphite, and the like).

The preferred implementations of the present application will be described in detail below in conjunction with embodiments. It should be understood that the following embodiments are given for illustrative purposes only, and are not intended to limit the scope of the present application. Those skilled in the art can make various modifications and substitutions to the present application without departing from the objective and spirit of the present application.

The experimental methods used in the following embodiments are conventional methods unless otherwise specified.

The materials, reagents, and the like used in the following embodiments are commercially available unless otherwise specified.

Embodiment 1

In this embodiment, a heavily polluted river (the water surface had a length of about 20 m, a width of about 2 m and a total area of 40 $m^2$, the river section had dispensing equipment at the shore, the water depth was 3-5 m, the water quality was inferior to the water quality standard Class V according to the Environmental Quality Standards for Surface Water, and the dissolved oxygen was less than 2.0 mg/L) was taken as a governance object.

(1) 40 sediment samples may be uniformly taken at different positions of the sediment-water interface every 1 $m^2$.

Microbial DNA in the samples was extracted, conventional technical means in the art, such as DNA purification→PCR amplification→fluorescence quantification→Miseq library construction→Miseq sequencing, and the like, may be used to perform 16sRNA high-throughput sequencing analysis on an alkaline phosphatase phoD functional flora whose main microorganisms may be bacteria of *Limnohabitans, Pirellula* and *Plesiocystis* to obtain the abundance of the alkaline phosphatase phoD functional flora in the sediment samples at different sampling positions, and the sampling position of the sediment sample with the abundance of the alkaline phosphatase phoD functional flora of greater than 25% was determined as the position of the sediment to be controlled. 11 positions of the sediment to be controlled may be determined.

(2) Emission flux of bioavailable phosphorus of the sediment at different depths was measured at the determined position of the sediment to be controlled in step (1), and a depth range where the emission flux was greater than 0.6 mg/L was determined as the depth of the sediment to be controlled.

The depths of the sediment to be controlled at the 11 positions may be determined to be 2 m, 1.8 m, 1.6 m, 1.4 m, 1.2 m, 1.0 m, 0.8 m, 0.6 m, 0.4 m, 0.2 m, 0 m, i.e., the sediment-water interface), respectively.

(3) With the determined positions to be controlled (sampling positions) in step (1) as the center, the area 1 $m^2$ around the center was respectively defined as the controlled area.

For the controlled area, an 80 mg/L nitrate (sodium nitrate or potassium nitrate) solution was applied to the sediment-water interface to adjust the pH of the water body of the area to be controlled to 7.5-8.3, and 50 mg/L low-oxygen aeration was performed in cooperation.

Then, positive and negative electrodes prepared from the novel electrode material of the present application may be inserted oppositely into the sediment at the edge of the controlled area, where the insertion depth was ⅔ of the length of the electrode. A low voltage of 12 V and a high current of 10 A may be applied to form a low-voltage high-current electric field.

Extraction and dewatering treatment may be performed on the sediment of the controlled area under vacuum negative pressure conditions.

By controlling the depth of the electrode inserted into the sediment, the treatment of the sediment at different governance depths was realized.

After the treatment, the water content of the sediment was reduced to about 50%, and the volume of the sediment was reduced by 20-30%. Then, there was no need to perform ion-exchange membrane treatment on the dewatered sludge.

Compared with the traditional sediment dewatering technology, the dewatering cost of electrodynamic sludge dewatering and the subsequent treatment cost may be reduced by 30% or above and about 40%, respectively.

After the governance, the water quality was significantly improved, reaching Class III according to the standards for surface water. After 24 hours of treatment, the dissolved oxygen at the bottom of the water body can be increased to 3.0 mg/L or above, the onset time was shortened by more than half compared with similar products, and the action time was increased by 4 times compared with similar products.

Embodiment 2

In this embodiment, a heavily polluted small lake (the small lake had a total area of 100 $m^2$, had dispensing equipment conditions at the shore and had a water depth of 0.7-2 m, the water quality was inferior to the water quality standard Class V according to the Environmental Quality Standards for Surface Water, and the dissolved oxygen was less than 2.0 mg/L) was taken as a governance object.

(1) 25 sediment samples may be uniformly taken at different positions of the sediment-water interface every 4 $m^2$.

Microbial DNA in the samples was extracted, conventional technical means in the art, such as DNA purification→PCR amplification→fluorescence quantification→Miseq library construction→Miseq sequencing, and the like, may be used to perform 16sRNA high-throughput sequencing analysis on an alkaline phosphatase phoD functional flora whose main microorganisms may be bacteria of *Limnohabitans, Pirellula* and *Plesiocystis* to obtain the abundance of the alkaline phosphatase phoD functional flora in the sediment samples at different sampling positions, and the sampling position of the sediment sample with the abundance of the alkaline phosphatase phoD functional flora of greater than 25% was determined as the position of the sediment to be controlled. 8 positions of the sediment to be controlled may be determined.

(2) Emission flux of bioavailable phosphorus of the sediment at different depths was measured at the determined position of the sediment to be controlled in step (1), and a depth range where the emission flux was greater than 0.6 mg/L was determined as the depth of the sediment to be controlled.

The depths of the sediment to be controlled at the 8 positions may be determined to be 1.3 m, 1.1 m, 0.9 m, 0.7 m, 0.5 m, 0.3 m, 0.1 m and 0 m (that is, the sediment-water interface), respectively.

(3) With the determined positions to be controlled (sampling positions) in step (1) as the center, the area 1 m² around the center was respectively defined as the controlled area.

For the controlled area, an 80 mg/L nitrate (sodium nitrate or potassium nitrate) solution was applied to the sediment-water interface to adjust the pH of the water body of the area to be controlled to 7.5-8.3, and 50 mg/L low-oxygen aeration was performed in cooperation.

Then, positive and negative electrodes prepared from the novel electrode material of the present application may be inserted oppositely into the sediment at the edge of the controlled area, where the insertion depth was ⅔ of the length of the electrode. A low voltage of 12 V and a high current of 10 A may be applied to form a low-voltage high-current electric field.

Extraction and dewatering treatment may be performed on the sediment of the small lake under vacuum negative pressure conditions.

By controlling the depth of the electrode inserted into the sediment, the treatment of the sediment at different governance depths was realized.

After the treatment, the water content of the sediment was reduced to about 50%, and the volume of the sediment was reduced by 20-30%. Then, there was no need to perform ion-exchange membrane treatment on the dewatered sludge.

Compared with the traditional sediment dewatering technology, the dewatering cost of electrodynamic sludge dewatering and the subsequent treatment cost may be reduced by 30% or above and about 40%, respectively.

After the governance, the water quality of the small lake was significantly improved, reaching and even exceeding Class III according to the standards for surface water. After 24 hours of treatment, the dissolved oxygen at the bottom of the water body can be increased to 3.0 mg/L or above, the onset time was shortened by more than half compared with similar products, and the action time was increased by 4 times compared with similar products.

In combination with the electrodialysis-vacuum negative pressure dewatering technology of the present application, the water content of the sediment can be reduced to about 50%, the volume of the sediment can be reduced by 20-30%, and the dewatering cost of electrodynamic sludge dewatering can be reduced by 30% or above and the subsequent treatment cost can be reduced by about 40% or above. In addition to the increase of the dewatering rate, the operating cost and subsequent treatment cost are also reduced, and good social benefits and economic benefits are obtained.

Although the present application has been described in detail above with general descriptions and specific implementations, some modifications or improvements can be made on the basis of the present application, which is obvious to those skilled in the art. Therefore, all these modifications or improvements made without departing from the spirit of the present application shall belong to the protection scope of the present application.

The invention claimed is:

1. A method for positioning and in-situ treatment of pollutants at a sediment-water interface, comprising:
    determining a position of the sediment to be controlled through high-throughput sequencing analysis, wherein the high-throughput sequencing analysis comprises analyzing an abundance of an alkaline phosphatase phoD functional flora in the sediment to be controlled in molecular biology;
    determining a depth of the sediment to be controlled based on the position of the sediment to be controlled through pollutant source apportionment, wherein the pollutant source apportionment comprises measuring emission flux of bioavailable phosphorus of the sediment to be controlled at different depths at the position of the sediment to be controlled; and
    performing in-situ dewatering treatment on the sediment to be controlled based on the position of the sediment to be controlled and depth of the sediment to be controlled through electrodialysis-vacuum negative pressure dewatering.

2. The method according to claim 1, wherein performing in-situ dewatering treatment on the sediment to be controlled comprises:
    using nitrate to adjust the pH of a water body of an area to be controlled to 7.5-8.3;
    changing a dominant flora in the sediment; and
    placing the sediment to be controlled in an electric field, and performing dewatering treatment on the sediment under vacuum negative pressure conditions.

3. The method according to claim 2, wherein after using nitrate to adjust the pH of a water body of an area to be controlled to 7.5-8.3, the method further comprising:
    performing low-oxygen aeration treatment on the water body.

4. The method according to claim 3, wherein an oxygen aeration amount of the low-oxygen aeration is 30-60 mg/L.

5. The method according to claim 3, wherein an oxygen aeration amount of the low-oxygen aeration is 50 mg/L.

6. The method according to claim 2, wherein the electric field is an electric field with a voltage of 10-12 V and a current of 8-10 A.

7. The method according to claim 2, wherein the nitrate is sodium nitrate and/or potassium nitrate.

8. The method according to claim 2, wherein the electric field is generated by:
    placing positive and negative electrodes oppositely at an edge of the sediment to be controlled; and
    applying a voltage of 12 V and a current of 10 A.

9. The method according to claim 1, wherein said determining the position of the sediment to be controlled through high-throughput sequencing analysis comprises taking sediment samples at different positions of the sediment-water interface in a river/lake water area to be controlled, extracting microbial DNA in the samples, performing 16sRNA high-throughput sequencing analysis to obtain abundance of the alkaline phosphatase phoD functional flora in the sediment samples at the different positions, and determining a sampling position of the sediment sample with the abundance of the alkaline phosphatase phoD functional flora of greater than 25% as the position of the sediment to be controlled; and
    said determining the depth of the sediment to be controlled based on the position of the sediment to be controlled through pollutant source apportionment comprises measuring emission flux of bioavailable phosphorus of the sediment at different depths at the position of the sediment to be controlled and determining a depth range where the emission flux is greater than 0.6 mg/L as the depth of the sediment to be controlled.

\* \* \* \* \*